July 11, 1961 N. SWERDLOW 2,992,290

FORCED-COOLED ISOLATED PHASE BUS

Filed Nov. 9, 1959 2 Sheets-Sheet 1

INVENTOR.
NATHAN SWERDLOW
BY
William Freedman
ATTORNEY

July 11, 1961 N. SWERDLOW 2,992,290
FORCED-COOLED ISOLATED PHASE BUS
Filed Nov. 9, 1959 2 Sheets-Sheet 2

INVENTOR.
NATHAN SWERDLOW
BY William Friedman
ATTORNEY

United States Patent Office 2,992,290

Patented July 11, 1961

2,992,290

FORCED-COOLED ISOLATED PHASE BUS

Nathan Swerdlow, Philadelphia, Pa., assignor to General Electric Company, a corporation of New York Filed Nov. 9, 1959, Ser. No. 851,892
4 Claims. (Cl. 174—16)

This invention relates to an isolated phase bus of the type that is cooled by the forced flow of cooling fluid through its various components.

In order to decrease the amount of space required by a bus of given current rating and in order to decrease the cross-sectional area required for the conduction of given amounts of current without overheating, it has been proposed heretofore that the bus be provided with means for forcibly circulating cooling fluid through its various components. Prior forced-cooling systems of which I am aware either have not been capable of extracting as much heat as might be desired or have not been as effective as desired in maintaining a generally uniform temperature of the bus conductors throughout their length. With regard to this latter point, many prior cooling systems of which I am aware have cooled the bus conductors to a much greater extent at certain locations along their length than at other locations along their length. In order to prevent overheating of the lesser-cooled portions of the bus conductors, it has been necessary to excessively cool those other portions of the conductors where the cooling effect is the greatest. As a result, a portion of the cooling capacity of such cooling systems has been wastefully dissipated in maintaining unnecessarily low temperatures at certain locations along the bus conductor.

Accordingly, an object of my invention is to provide for an isolated phase bus, a cooling system which not only has an exceptionally high cooling capacity, but also is capable of maintaining the bus conductors at an approximately uniform temperature throughout their length.

Another object is to design the cooling system in such a manner that it can be incorporated into a bus of generally conventional design without the necessity of extensive structural changes in the bus.

In carrying out my invention in one form, I provide an isolated phase bus which comprises a plurality of conductors of tubular form and a plurality of metallic enclosures respectively surrounding the conductors in spaced-apart relationship. The conductors and their respective enclosures extend between spaced-apart first and second locations, and at each of these locations the conductors are hydraulically interconnected by suitable conduit means and the enclosures are interconnected by suitable duct means. A pump is provided for circulating cooling liquid between said first and second location via a path extending through said conductors and said conduit means. A blower or fan is provided for circulating cooling gas between said first and second locations via a path extending through said enclosures and said duct means. The blower forces the cooling gas in a direction opposite to the direction of flow of the cooling liquid and the path of flow through the enclosures for the cooling gas is located between each of the enclosures and its respective conductor. Heat-exchanging means for extracting heat from the cooling liquid and heat-exchanging means for extracting heat from the cooling gas are provided at one of the two locations. The heat-exchanging means are so located that at successive points along the length of each conductor the cooling capacity of the gas and the cooling of the liquid change in opposite directions with respect to each other. These oppositely-varying cooling capacities tend to offset each other, thus tending to maintain a more uniform over-all cooling capacity along the length of the conductors, thus tending to maintain a more uniform temperature along the length of the conductors.

For a better understanding of my invention, reference may be had to the following description taken in conjunction with the accompanying drawings, wherein.

Figures 1, 4, 5:
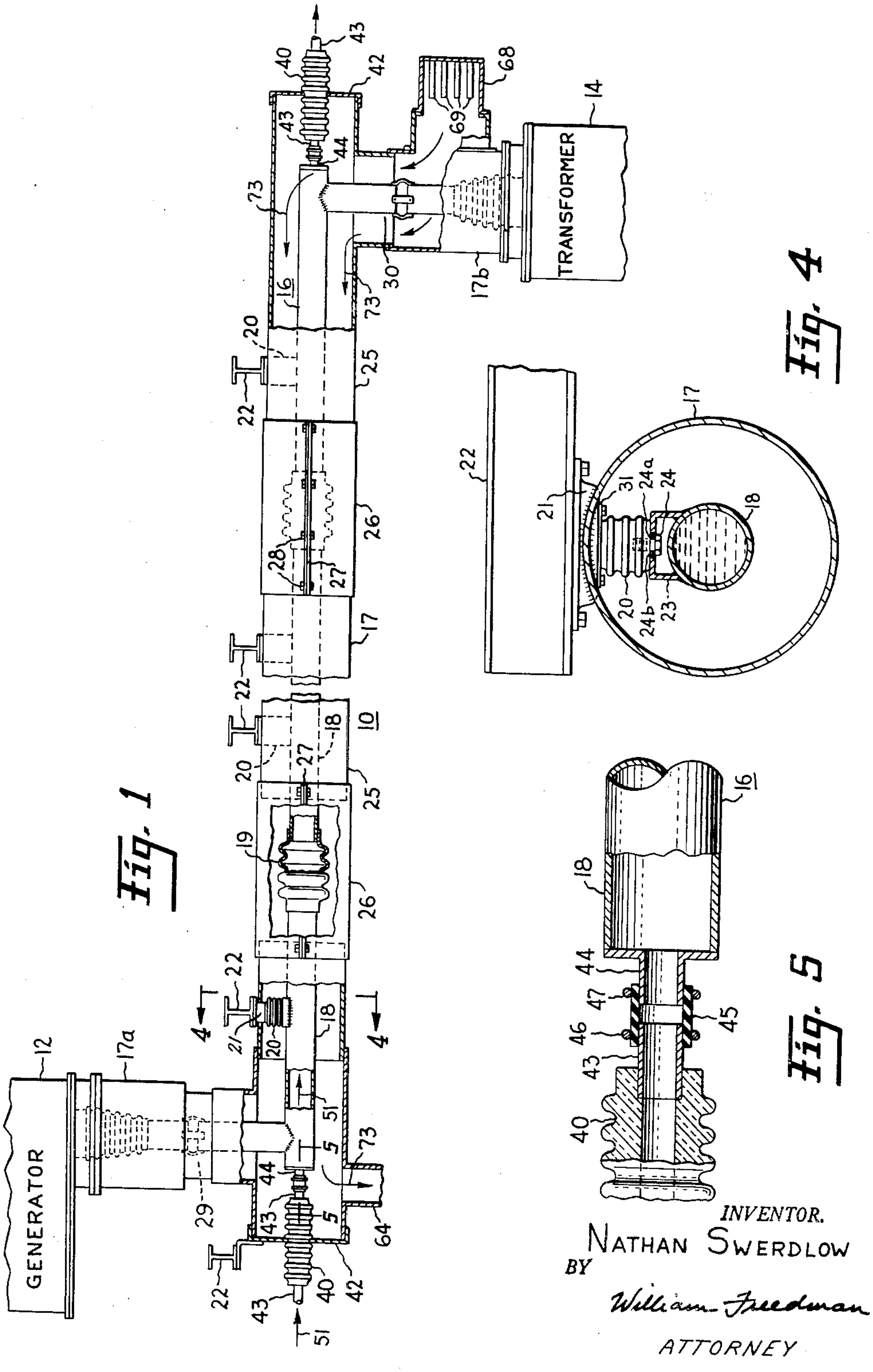
FIG. 1 is a side elevational view, partly in section, showing an electric bus embodying one form of my invention.
FIG. 4 is a sectional view taken along the line 4—4 of FIG. 1.
FIG. 5 is a detailed sectional view taken along the line 5—5 of FIG. 1.

Referring now to FIG. 1, there is shown an isolated phase bus 10 which is electrically connected between a generator 12 and a transformer 14 so that alternating electric power may be supplied through the bus from the generator to the transformer.

Figures 2, 3:
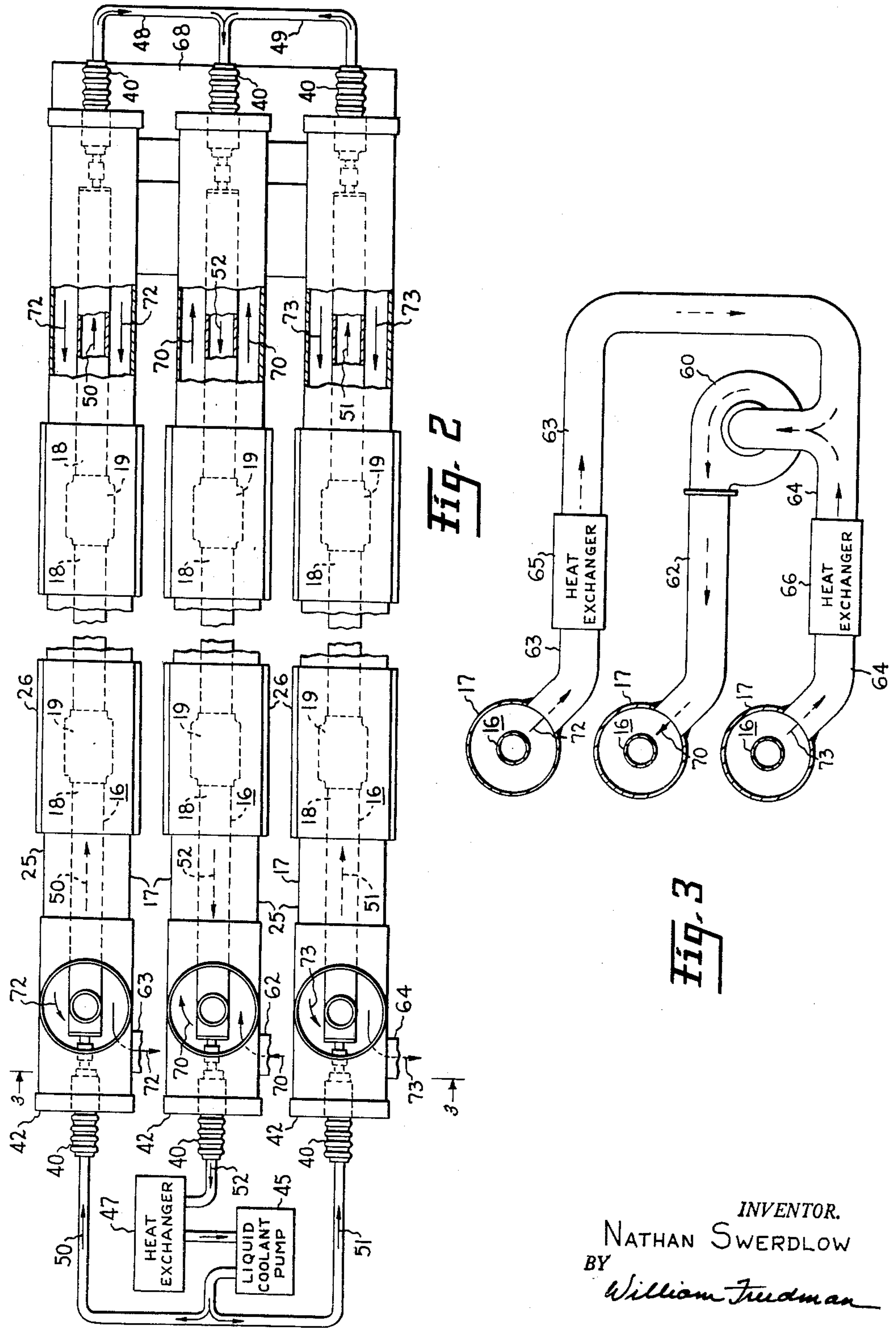
FIG. 2 is a plan view, partially schematic, of the bus shown in FIG. 1.
FIG. 3 is a partially schematic view taken along the line 3—3 of FIG. 2.

Referring to FIG. 2, the bus 10 is shown as a polyphase bus comprising three spaced-apart phase conductors 16, each of which is surrounded in spaced-apart relationship by its own enclosure 17. Each of the phase conductors 16 is constituted by a continuous tube made up from a plurality of rigid tubular conductive segments 18 disposed in end-to-end relationship and electrically connected together in series-circuit relationship by means of flexible conductive devices 19 disposed between adjacent segments 18. At spaced-apart locations along the length of each conductor 16, the segments are supported by means of suitable insulators 20, shown in FIGS. 1 and 4. Each of these insulators 20 is suitably attached at one end to the supported segment 18 and is attached at its other end to a transversely-extending support 21, which is bolted to a supporting I-beam 22. Preferably each of the insulators 20 is not secured directly to its support 20 but rather is secured to a resilient mounting plate 31 which is, in turn, bolted to the support 20. These resilient mounting plates 31 permit limited transverse movement of the conductor 16 under short circuit conditions thereby lessening the insulator stresses, as is described in more detail and claimed in Patent No. 2,892,012, Swerdlow et al., assigned to the assignee of the present invention.

To allow for thermally-induced expansion and contraction of the conductive segments 18 without damage to the insulators 20, a suitable slip joint such as shown in FIG. 4 is provided between each segment 18 and one of its two supporting insulators 20. This slip joint of FIG. 4 comprises a channel 23 having its flanges welded to the top of the tubular conductor 18 and its web bolted to the insulator 20 by means of a suitable bolt 24. The bolt 24 extends through a slot 24$a$ that extends longitudinally of the conductive segment 18, and this slot permits the segment 18 to expand and contract lengthwise in response to temperature changes without damaging the insulator 20. Preferably, a suitable spacer 24$b$ is provided about the bolt to preclude excessive tightening of the bolt. It is to be noted that this slip joint is so constructed as not to require any openings in the wall of the conductor 18. Those joints where the conductor 18 is rigidly fixed to its insulator generally correspond to the joint of FIG. 4 except that the spacer 24$b$ is omitted and a small circular hole rather than a slot receives the bolt 24 so that tightening of the bolt rigidly clamps the channel 24 to the insulator 20.

The enclosure 17 for each conductor 16 is of a highly conductive metal, such as aluminum, and is electrically isolated from its high voltage conductor 16 by means of the supporting insulators 20 and the air space between the enclosure 17 and its conductor 16. Preferably, each enclosure 17 is electrically connected to ground by suitable conventional means, such as disclosed and claimed in my U.S. Patent 2,892,012, assigned to the assignee of the present invention. The enclosure 17 can be of any suitable conventional form but preferably comprises a series of circumferentially-continuous duct sections 25 disposed in spaced-apart axially-aligned relationship. Adjacent duct sections 25 are interconnected by means of tubular split covers 26, each of which embraces the adjacent ends of adjacent duct sections. Each of these tubular covers is preferably composed of two semi-cylindrical portions that are bolted together along longitudinally-extending seams 27 by suitable bolts 28 disposed at the seams. Tightening of the bolts causes the split cover to tightly embrace the adjacent ends of the duct sections. Suitable gaskets are present at all joints so as to minimize the possibility of leakage between the interior of the enclosure and the surrounding air space.

At the generator end of each of the enclosures, the enclosure is provided with a suitable laterally extending housing **17*a* that encloses the electrical connection 29 between the generator and the main body of the conductor 16. This connection, which includes a suitable flexible joint, can be of any suitable form and its details are therefore not shown. It is to be understood, however, that the parts forming this connection are of such dimensions that they do not require the liquid cooling soon to be described to prevent over-heating. A similar housing 17*b* is provided at the transformer end of each enclosure to enclose the electrical connection 30 between the transformer and the main body of the conductor 16**. This connection, which includes a suitable flexible joint, can also be of a conventional form and is therefore not shown in detail. The parts forming this connection also are of such dimension that they do not require the liquid cooling soon to be described to prevent overheating.

The flexible conductive devices 19 that inter-connect adjacent ends of the tubular conductive segments 18 are preferably of a bellows-type construction. Each of these devices has axially-yieldable corrugated walls and tubular end portions fitted about the opposed ends of adjacent tubular segments 18. Each of these tubular end portions is suitably welded about its periphery to the outer periphery of the particular tubular segment 18 located inside the tube 19. These flexible conductive devices 19 serve not only to conduct current between the segments 18 but also serve to provide a leak-proof joint between the tubular segments for the conduction of cooling liquid between the segments, as will soon be explained.

For conducting cooling liquid to and from each conductor 16, there is provided at each end of each of the conductors 16 a tubular bushing 40 which is supported within an opening provided in a plate 42 closing off the end of the enclosure 17. Each of these tubular bushings 40 has a short adaptor pipe 43 extending from each of its ends. Axially aligned with these adaptor pipes 43 is a pipe 44 projecting from one end of the tubular conductor 16. A flexible hose 45 is fitted over these aligned pipes and is suitably clamped at its ends about the outer periphery of the pipes, as by means of resilient clamping rings 46 and 47, so as to provide leak-proof joints between the hose 45 and the pipes 43 and 44. A suitable conduit is clamped about the adaptor pipe 43 at the other end of the bushing for the purpose of conducting cooling liquid to or from the bushing 40. Each of the bushings 40 serve not only to conduct liquid to the adjacent conductor 16 but serves also electrically to isolate the conductor 16 from its enclosure 17.

For forcing cooling liquid through the conductor 16 via the bushings 40, a pump schematically shown at 45 in FIG. 2 is provided at the generator end of the bus 10. This pump 45 is shown connected with its discharge port connected to the parallel combination of the two outer phase conductors 16 and with its intake port connected to the center phase conductor 16 through a suitable heat exchanger 47. At the transformer end of the bus, all of the phase conductors 16 are hydraulically connected directly together by suitable conduits 48 and 49. Thus, the pump 45 acts to force liquid coolant through the outer phase conductors in the direction indicated by the arrows 50 and 51 and to return this coolant through the center phase conductor in the direction indicated by the arrows 52. The heat that the coolant extracts from the conductors 16 in passing therethrough is transferred to the heat exchanger 47, thus maintaining the liquid coolant leaving the pump at a sufficiently low temperature to enable it to effect the desired cooling action. As a cooling liquid, I prefer to use water, suitably deaerated and deionized to avoid any electrical breakdown or corrosion problems.

To aid the liquid in cooling conductors 16 and for another reason soon to be explained, air is circulated through the bus externally to the conductors 16 via the cylindrical passageways disposed between the conductors 16 and their enclosures 17. For forcing this air through the enclosure 17, a motor-driven blower or fan 60 is provided at the generator end of the bus. This blower 60 has its discharge connected to the central enclosure 17 through a duct 62 and its inlet connected to the parallel combination of the two outer enclosures 17 through ducts 63 and 64. Connected in these ducts 63 and 64 are suitable heat exchangers 65 and 66, which act to cool the air as it leaves the bus. At the transformer end of the bus, a header 68 formed of suitable ducts interconnects the three enclosures and affords communication between the interiors of the enclosures. Thus, it will be apparent that operation of the blower forces cooling air first through the central enclosure 17 in the direction of arrows 70 (opposite to the direction in which the liquid coolant flows) and then through the parallel combination of the outer enclosure 17 in the direction of the arrows 72 and 73 (also opposite to the direction of flow of the liquid coolant). In leaving the outer enclosures 17, the heated air passes through the heat exchangers 65 and 66 prior to entering the blower 60, and the heat exchangers cool the air passing therethrough sufficiently to enable it to effect the desired cooling upon recirculation. To further aid in cooling the air, suitable metallic baffles 69 are preferably provided in header 68. These baffles extract heat from the air by convection as the air traverses the header. The header 68 is preferably located at the lower end of the housings **17*b* adjacent the transformer 14 so that air flowing to or from the header acts to cool the connections 30** between the bus and the transformer.

The forced flow of air through the enclosure 17 serves not only to cool the conductor 16 but serves also to cool the metallic enclosures 17. Each of these enclosures 17 tends to become heated because of eddy currents induced therein by flux escaping from adjacent enclosures. These eddy currents flowing through the various sections of the enclosures generate heat which must be effectively removed in order to prevent overheating of the enclosures. The forced flow of cooling air past the internal surfaces of the enclosure is effective in removing such heat and in thereafter transferring it to the heat exchangers 65 and 66 and to the cooling baffles 69.

I am aware that forced-air cooling systems have been utilized heretofore for isolated phase buses, but the cooling capacity of such systems has not been as high as might be desired due to practical limitations on the amount of air that can be circulated through the bus. With my described arrangement, however, I am able to provide for greatly increased cooling capacity as compared to such prior systems, inasmuch as I not only utilized the forced-air cooling of such prior systems but also utilized forced-liquid cooling in combination with the forced-air cooling. Since a given volume of water can remove on the order of fifty times as much heat as the same volume of air under corresponding temperature conditions, it should be apparent that the cooling capacity of the over-all system is greatly increased by the inclusion of forced-liquid cooling.

Another deficiency of many prior cooling systems is that they have cooled the conductors to a much greater extent at certain locations along their length than at other locations along their length. As a result, wide divergencies in the temperature of the conductor have occurred at various points along the length of the conductor. This has resulted in inefficient operation because the cooling system, in performing its necessary function of maintaining hot spot temperature below a certain prescribed maximum, has wastefully dissipated a portion of its cooling capacity in producing unnecessarily low temperatures at other spots on the conductor.

I have been able to effect much more uniform temperatures of the conductors along their lengths by directing the cooling air through the bus in a direction opposite to the direction of flow of the cooling liquid; by introducing the fully-cooled air into the bus at the location where the fully-heated liquid leaves the bus (i.e., the left-hand end of the centrally located phase of FIG. 2); and by introducing the fully-cooled liquid into the bus at the point where the fully-heated air leaves the bus (i.e., the left-hand end of the two outer phases of FIG. 2). Accordingly, as the cooling capacity of the air decreases at points spaced along the length of a given conductor, the cooling capacity of the liquid increases; and, conversely, as the cooling capacity of the liquid decreases at points spaced along the length of a conductor in the direction of liquid flow, the cooling capacity of the air increases. These oppositely-varying cooling capacities tend to offset each other, thus tending to maintain a more uniform overall cooling capacity along the length of the conductors, and, correspondingly, tending to maintain a more uniform conductor temperature along the length of the conductors.

I prefer to locate the pump, fan, and heat exchangers at the generator end of the bus, as shown, inasmuch as these components can easily be placed indoors if so located. Here, they are protected against the weather and are readily accessible for maintenance. Additionally, by locating these components all at one end with the heat exchangers at the intake end of the pump and fan, the pump and fan are required to handle only cool fluid. This decreases the power requirements for these devices and also imposes less severe working conditions on these devices. Locating all of these devices at one end also enables me to use readily-available package units for the fan and its heat exchangers and for the pump and its heat exchanger. If the application is such that these advantages are not of controlling importance, it is possible to locate all of the heat exchangers at the transformer end of the bus.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. An isolated phase bus comprising a plurality of laterally-spaced conductors of tubular form extending between spaced-apart first and second locations; a plurality of tubular metallic enclosures extending between said locations and respectively surrounding said tubular conductors; insulating means for supporting each of said conductors in spaced-apart relationship to its enclosure; conduit means for hydraulically interconnecting said conductors at each of said locations; means for forcing a flow of cooling liquid first through one of said conductors from said first location to said second location, then through said conduit means at said second location, then from said second location back to said first location through another conductor; means for extracting heat from said cooling liquid at said first location so that said cooling liquid is cooler upon entering said one conductor than upon leaving said other conductor; duct means for interconnecting the interiors of said enclosures at each of said locations; and means for forcing a flow of cooling gas first through the enclosure surrounding said other conductor from said first location to said second location, then through the duct means at said second location, then from said second location back to said first location through the enclosure surrounding said one conductor; the path through said enclosures for said cooling gas being located between each of the enclosures and its respective conductor; and means for extracting heat from said cooling gas at said first location so that said gas is cooled prior to entering the enclosure surrounding said other conductor.

2. An isolated phase bus comprising a plurality of laterally-spaced conductors of tubular form extending between spaced-apart first and second locations; a plurality of tubular metallic enclosures extending between said locations and respectively surrounding said tubular conductors; insulating means for supporting each of said conductors in spaced-apart relationship to its enclosure; conduit means for hydraulically interconnecting said conductors at each of said locations; duct means for affording communication between the interiors of said enclosures at each of said locations; means for circulating cooling liquid between said first and second locations via a path extending through said conductors and said conduit means; means for circulating cooling gas between said first and second locations via a path extending through said enclosures and said duct means and in a direction opposite to the direction of flow of said cooling liquid; the path through said enclosures for said cooling gas being located between each of said enclosures and its respective conductor; heat-exchanging means for extracting heat from said cooling liquid; heat-exchanging means for extracting heat from said cooling gas; said heat-exchanging means being so located that at successive points along the length of each conductor the cooling capacity of said gas and the cooling capacity of said liquid change in opposite directions with respect to each other.

3. An isolated phase bus comprising a plurality of laterally-spaced conductors of tubular form extending between spaced-apart first and second locations; a plurality of tubular metallic enclosures extending between said locations and respectively surrounding said tubular conductors; insulating means for supporting each of said conductors in spaced-apart relationship to its enclosure; conduit means for hydraulically interconnecting said conductors at each of said locations; duct means for affording communication between the interiors of said enclosures at each of said locations; means for circulating cooling liquid between said first and second locations via a path extending through said conductors and said conduit means; means for circulating cooling gas between said first and second locations via a path extending through said enclosures and said duct means and in a direction opposite to the direction of flow of said cooling liquid; the path through said enclosures for said cooling gas being located between each of said enclosures and its respective conductor; heat-exchanging means for extracting heat from said cooling liquid; heat-exchanging means for extracting heat from said cooling gas; said heat-exchanging means being so located at a single one of said locations that at successive points along the length of each conductor the temperature of said cooling gas and the temperature of said liquid change in opposite directions with respect to each other.

4. An isolated phase bus comprising three laterally-spaced conductors of tubular form extending between spaced-apart first and second locations; three tubular metallic enclosures extending between said locations and respectively surrounding said tubular conductors; insulating means for supporting each of said conductors in spaced-apart relationship to its enclosure; conduit means for hydraulically interconnecting said conductors at each of said locations; duct means for affording communication between the interiors of said enclosures at each of said locations; means for forcing cooling liquid from said first to said second locations via the parallel combination of a first two of said conductors and for returning the cooling liquid to said first location through the remaining conductor; means for forcing cooling gas from said first to said second locations via the enclosure surrounding said remaining conductor and for returning the cooling gas to said first location through the parallel combination of the enclosures surrounding said first two conductors; the path through said enclosures for said cooling gas being located between each of said enclosures and its respective conductor; heat-exchange means for extracting heat from said cooling liquid; heat-exchanging means for extracting heat from said cooling gas; said heat-exchange means being so located that at successive points along the length of each conductor the cooling capacity of said gas and the cooling capacity of said liquid change in opposite directions with respect to each other.

References Cited in the file of this patent

UNITED STATES PATENTS

| | | |
|---|---|---|
| 1,613,010 | Armstrong | Jan. 4, 1927 |
| 1,863,786 | Feldmeier | June 21, 1932 |
| 2,306,527 | Daniels | Dec. 29, 1942 |
| 2,861,119 | Collonge | Nov. 18, 1958 |
| 2,878,300 | Rugg | Mar. 17, 1959 |